United States Patent
Tao

(10) Patent No.: US 9,589,050 B2
(45) Date of Patent: Mar. 7, 2017

(54) SEMANTIC CONTEXT BASED KEYWORD SEARCH TECHNIQUES

(71) Applicant: International Business Machines Corporation, Armonk, NY (US)

(72) Inventor: Jim J. Tao, Sewickley, PA (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 14/247,054

(22) Filed: Apr. 7, 2014

(65) Prior Publication Data
US 2015/0286708 A1 Oct. 8, 2015

(51) Int. Cl.
*G06F 17/30* (2006.01)

(52) U.S. Cl.
CPC .. *G06F 17/30675* (2013.01); *G06F 17/30684* (2013.01); *G06F 17/30864* (2013.01)

(58) Field of Classification Search
CPC ......... G06F 17/30675; G06F 17/30684; G06F 17/30864
USPC ........................................................ 707/730
See application file for complete search history.

(56) References Cited

U.S. PATENT DOCUMENTS

| 6,374,241 | B1 | 4/2002 | Lamburt et al. |
| 6,385,602 | B1 | 5/2002 | Tso et al. |
| 6,571,239 | B1 | 5/2003 | Cole et al. |
| 7,428,582 | B2 | 9/2008 | Bean et al. |
| 7,620,627 | B2 | 11/2009 | Cava |
| 7,636,714 | B1 | 12/2009 | Lamping et al. |
| 7,933,764 | B2 | 4/2011 | Kang et al. |

(Continued)

FOREIGN PATENT DOCUMENTS

| CN | 101931654 | 12/2010 |
| CN | 101984423 | 3/2011 |

(Continued)

OTHER PUBLICATIONS

Aguliera, U. et al., "A Semantic Matching Algorithm for Discovery in UDDI", dated 2007, International Conference on Semantic Computing, IEEE Computer Society, 8pp., Sep. 17-19, 2007.

(Continued)

*Primary Examiner* — Rehana Perveen
*Assistant Examiner* — Hicham Skhoun
(74) *Attorney, Agent, or Firm* — Janaki K. Davda; Konrad, Raynes, Davda and Victor LLP

(57) ABSTRACT

Provided are semantic context based keyword search techniques. A query with one or more keywords, one or more relevant words, and one or more selected services is received. A general relevance indicator for services in a category is calculated based on keyword relevance indicators of the one or more keywords in the query for each service among services in the category and relevant word relevance indicators of the one or more relevant words in the query for the services in the category. The services in the category are ranked based on the general relevance indicator for each service. In response to determining that at least one of the selected services is not ranked high with reference to the ranked services in the category, at least one of: one or more additional keywords, one or more additional relevant words, and one or more additional services to provide as recommendations are identified.

15 Claims, 7 Drawing Sheets

(56) References Cited

U.S. PATENT DOCUMENTS

| | | | |
|---|---|---|---|
| 8,074,234 B2 | 12/2011 | Tang et al. | |
| 8,352,491 B2 | 1/2013 | Roshen | |
| 8,667,007 B2 | 3/2014 | Tao | |
| 8,682,924 B2 | 3/2014 | Tao | |
| 8,799,250 B1* | 8/2014 | Smith | G06F 17/30867 707/705 |
| 2003/0088553 A1 | 5/2003 | Monteverde | |
| 2003/0187841 A1 | 10/2003 | Zhang et al. | |
| 2004/0078216 A1 | 4/2004 | Toto | |
| 2006/0117002 A1 | 6/2006 | Swen | |
| 2007/0118509 A1 | 5/2007 | Svendsen | |
| 2007/0136236 A1 | 6/2007 | Kussmaul et al. | |
| 2007/0214154 A1 | 9/2007 | Ducatel et al. | |
| 2007/0288433 A1 | 12/2007 | Gupta et al. | |
| 2008/0104050 A1 | 5/2008 | Kehl | |
| 2009/0049040 A1 | 2/2009 | Fay et al. | |
| 2009/0222444 A1 | 9/2009 | Chowdhury et al. | |
| 2009/0313236 A1 | 12/2009 | Hernacki et al. | |
| 2010/0036822 A1 | 2/2010 | Riley et al. | |
| 2010/0131563 A1 | 5/2010 | Yin | |
| 2010/0174691 A1 | 7/2010 | Caldwell et al. | |
| 2010/0185619 A1 | 7/2010 | Zhang et al. | |
| 2010/0228742 A1 | 9/2010 | Vandelle et al. | |
| 2011/0119242 A1 | 5/2011 | Chen et al. | |
| 2011/0179007 A1 | 7/2011 | Shi | |
| 2012/0095980 A1 | 4/2012 | Elyada | |
| 2012/0303651 A1* | 11/2012 | Tao | G06F 17/3053 707/768 |
| 2013/0086081 A1* | 4/2013 | Schonfeld | G06F 17/3089 707/748 |

FOREIGN PATENT DOCUMENTS

| | | |
|---|---|---|
| EP | 1681823 A1 | 7/2006 |
| WO | 2010033950 | 3/2010 |

OTHER PUBLICATIONS

Anyanwu, K. et al., "Effectively Interpreting Keyword Queries on RDF Databases With a Rear View", dated 2011, Semantic Computing Research Lab, Department of Computer Science, North Carolina State University, Raleigh NC,16 pp. (International Semantic Web Conference 2011, Bonn, Germany).

Bar-Yosef, Z., "Context-Sensitive Query Auto-Completion", dated Mar. 28-Apr. 1, 2011, total 10 pgs.

Bellwood, T., L. Clement, D. Ehnebuske, A. Hately, M. Hondo, Y.L. Husband, K. Januszewski, S. Lee, B. McKee, J. Munter, and C. Von Riegen, "UDDI Version 3.0", UDDI Spec Technical Committee Specification, [online], Jul. 19, 2002, [retrieved on Jul. 19, 2002], retrieved from the Internet at <URL: http://www.uddi.org/pubs/uddi-v3.00-published-20020719.htm>, 380 pp.

Blake, R. et al., "A Survey of Schema Matching Research", dated Sep. 1, 2007, College of Management Working Papers and Reports, Paper 3, University of Massachusetts Boston, 37 pp.

Colgrave, J., "A New Approach to UDDI and WSDL, Part 2: Queries Supported by the New OASIS UDDI WSDL Technical Note", [online], Sep. 3, 2003, [retrieved on Febraury 14, 2011], retrieved from the Internet at <URL: http://www.ibm.com/developerworks/webservices/library/ws-udmod2.html>, 6 pp.

Deng, J., Q. Zheng, and H. Peng, "Topic Distillation and Clustering Algorithm", Proceedings of the Fifth International Conference on Machine Learning and Cybernetics, Aug. 2006, 6 pp.

Dong, X. et al., "Similarity Search for Web Services", dated 2004, Proceedings of the 30th VLDB Conference, Toronto Canada, 12 pp.

Espinoza, M. and E. Mena, "Discovering Web Services Using Semantic Keywords", Proceedings of the 5th IEEE International Conference on Industrial Informatics, Jun. 2007, 6 pp.

Ferre, S. et al., "Semantic Search: Reconciling Expressive Querying and Exploratory Search", dated 2011, International Semantic Web Conference, Bonn Germany, 16 pp.

Fung, B.C.M., K. Wang, and M. Ester, "Hierarchical Document Clustering Using Frequent Itemsets", Proceedings of the SIAM International Conference on Data Mining, 2003, 12 pp.

IBM Corp., "WebSphere Service Registry and Repository", White Paper, [online], [Retrieved on Apr. 25, 2011], retrieved from the Internet at <URL: http://www-01.ibm.com/software/integration/wsrr/>, 2 pp.

Kang, S., "Keyword-Based Document Clustering", Proceedings of the Sixth International Workshop on Information Retrieval with Asian Languages—vol. 11, 2003, 6 pp.

Kraus, N. et al., "Context-Sensitive Query Auto-Completion", dated Mar. 28-Apr. 1, 2011, Hyderabad India, 10 pp.

Salton, G., A. Wong, and C.S. Yang, "A Vector Space Model for Automatic Indexing", Communications of the ACM, vol. 18, No. 11, Nov. 1975, 8 pp.

Theobald, M. et al., "TopX: Efficient and Versatile Top-k Query Processing for Semistructured Data", received Sep. 14, 2006, published Oct. 7, 2007, The VLDB Journal (2008), 35 pp.

Willett, P., "Recent Trends in Hierarchic Document Clustering: A Critical Review", Information Processing and Management, vol. 24, No. 5, 1988, 21 pp.

Zenz, G. et al., "From Keywords to Semantic Queries—Incremental Query Construction on the Semantic Web", dated Jul. 18, 2009, L3S Research Center, Appelstr. 9a, Hannover Germany, 24 pp.

Zhang, L., H. Li, and H. Chang, "XML Based Advanced UDDI Search Mechanism for B2B Integration", Electronic Commerce Research, vol. 3, Issue 1-2, Jan.-Apr. 2003, 10 pp.

International Search Report & Written Opinion, Sep. 13, 2012, for Application No. PCT/IB2012/052068, Total 12 pp.

Preliminary Amendment, Mar. 8, 2013, for U.S. Appl. No. 13/117,042, filed May 26, 2011 by J.J. Tao, Total 7 pp. [54.55 (PrelimAmend)].

Office Action, dated Apr. 10, 2013, for U.S. Appl. No. 13/117,042, filed May 26, 2011, entitled, "Hybrid and Iterative Keyword and Category Search Technique", invented by J.J. Tao, Total 34 pgs.

Response to Office Action, dated Jul. 10, 2013, for U.S. Appl. No. 13/117,042, filed May 26, 2011, entitled, "Hybrid and Iterative Keyword and Category Search Technique", invented by J.J. Tao, Total 16 pgs.

Notice of Allowance, dated Oct. 16, 2013, for U.S. Appl. No. 13/117,042, filed May 26, 2011, entitled, "Hybrid and Iterative Keyword and Category Search Technique", invented by J.J. Tao, Total 15 pgs.

Preliminary Remarks, dated Mar. 8, 2013, for U.S. Appl. No. 13/791,471, filed Mar. 8, 2013, entitled, "Hybrid and Iterative Keyword and Category Search Technique", invented by J.J. Tao, Total 2 pgs.

Office Action, dated Jul. 15, 2013, for U.S. Appl. No. 13/791,471, filed Mar. 8, 2013, entitled, "Hybrid and Iterative Keyword and Category Search Technique", invented by J.J. Tao, Total 23 pgs.

Response to Office Action, dated Oct. 15, 2013, for U.S. Appl. No. 13/791,471, filed Mar. 8, 2013, entitled, "Hybrid and Iterative Keyword and Category Search Technique", invented by J.J. Tao, Total 10 pgs.

Notice of Allowance, dated Oct. 30, 2013, for U.S. Appl. No. 13/791,471, filed Mar. 8, 2013, entitled, "Hybrid and Iterative Keyword and Category Search Technique", invented by J.J. Tao, Total 10 pgs.

US Patent Application, dated Dec. 19, 2013, for U.S. Appl. No. 14/135,175, filed Dec. 19, 2013, entitled, "Hybrid and Iterative Keyword and Category Search Technique", invented by J.J. Tao, Total 40 pgs.

Preliminary Remarks, dated Dec. 19, 2013, for U.S. Appl. No. 14/135,175, filed Dec. 19, 2013, entitled, "Hybrid and Iterative Keyword and Category Search Technique", invented by J.J. Tao, Total 1 pgs.

312 Amendment, dated Oct. 24, 2013, U.S. Appl. No. 13/117,042, filed May 26, 2011, entitled, "Hybrid and Iterative Keyword and Category Search Technique", invented by J.J. Tao, Total 8 pgs.

Mell, P., "Effectively and Securely Using the Cloud Computing Paradigm", dated Oct. 7, 2009, NIST Cloud Research Team, Information Technology Laboratory, Total 80 pgs.

(56) References Cited

OTHER PUBLICATIONS

Mell, P., "The NIST Definition of Cloud Computing (Draft)", dated Jan. 2011, Recommendations of the National Institute of Standards and Technology, Computer Security Division Information Technology Laboratory, Total 7 pgs.
Information Materials for IDS, dated Mar. 11, 2016, for CN Office Action dated Mar. 4, 216, Total 4 pages.
Information Materials for IDS, dated Feb. 18, 2016, for AU Office Action dated Feb. 11, 2016, Total 4 pages.
Notice of Acceptance and Bibliographic Attachment for AU Application No. 2012260534, dated Feb. 11, 2016, Total 2 pages.
List of IBM Patents or Patent Applications Treated as Related, dated May 16, 2016, Total 2 pages.
US Patent Application, for U.S. Appl. No. 13/117,042, filed May 26, 2011, invented by J.J. Tao et al.,Total 40 pages.
US Patent Application, for U.S. Appl. No. 13/791,471, filed Mar. 8, 2013, invented by J.J Tao et al., Total 36 pages.
US Patent Application, for U.S. Appl. No. 14/135,175, filed Dec. 19, 2013, invented by J.J Tao et al., Total 40 pages.
Office Action, dated Aug. 11, 2016, for U.S. Appl. No. 14/135,175, filed Dec. 19, 2013, invented by J.J Tao et al., Total 26 pages.
Response to Office Action, dated Nov. 10, 2016, for U.S. Appl. No. 14/135,175, filed Dec. 19, 2013, invented by J.J Tao et al., Total 20 pages.

\* cited by examiner

SEMANTIC CONTEXT BASED KEYWORD SEARCH TECHNIQUES

BACKGROUND

Embodiments of the invention relate to semantic context based keyword search techniques.

The amount of digital content available on the internet is enormous and it increases at a very fast pace. To be efficient and productive, most web users rely on web search engines to search for useful web pages through keyword search.

SOA and Cloud Computing rely on the underlying technologies to expose computing resources, applications, and data sources as services or utilities. Like web pages, the number of services exposed to the service users can be very large.

To facilitate the integration of computing systems to access data stored in different organization databases and other information silos through the internet and to provide richer content to end users, new web technologies have been introduced (such as ones developed for cloud computing, e.g., Software as a Service (SaaS) and Data as a Service (DaaS). Some of these technologies are RESTful (Representational State Transfer) web services and web services based on Simple Object Access Protocol (SOAP) and Web Service Definition Language (WSDL).

For example, a company may create a marketplace web site for different vendors to sell their products. Examples of web services include the web site's flexible fulfillment web service and payments web service, which are utilized to integrate the marketplace web site with the information systems of those vendors.

To facilitate publishing and searching web services, a Universal Description, Discovery and Integration (UDDI) standard was developed for SOAP based web services. The UDDI standard defines how to create a web service UDDI registry to enable web service providers to publish their web services and to enable web service consumers to search and use these published web services.

Ontology is used to describe knowledge as a set of concepts and their relationships in a knowledge domain. In ontology, reasoning may be used with formal logic rules to derive more knowledge from existing knowledge. To facilitate the description of concepts, their properties and relationships, shared vocabulary and taxonomies are defined in a specific ontology domain. Web Ontology Language (OWL), as well as its newer version OWL 2, is an ontology standard, which was originally developed in academic research to present data on the web in a machine-understandable format.

A non-UDDI based web service registry may offer web service governance features and semantic web technologies. Such web service registries or repositories store additional web services related metadata to govern the life cycles of web services. OWL may be used to organize the web service related metadata in such a web service registry.

In conventional systems, keyword search is used by a web service consumer to find web services in a web service registry. The keywords of a web service can be manually specified by a web service provider. An automatic keyword generation process may be used to generate keywords from web service metadata. The combination of the manual approach and the automatic approach, such as letting the provider verify or modify the generated keywords, may also be used.

Existing web service registries provide query Application Programming Interfaces (APIs) and/or Graphical User Interfaces (GUIs) to enable web service consumers to search for the web services published in the registry. With these query interfaces, users provide keywords, strings or other data in specific web service metadata fields to conduct the search and manually analyze the search result. These query APIs assume that the users have sufficient knowledge about what and how service metadata are stored in the registry and/or the exact keywords used by the services to specify metadata fields in a query and to carry out keyword searches. Also, the keywords may be ambiguous and service providers may use different naming conventions.

For example, a UDDI client may query a UDDI registry to find web services by providing the partial or full name of the web service, the business entity to which it belongs, and the category into which it falls. It also allows the user to search web services with composite queries. The search result of such a query may be the intersection or union of the collection of the search results of the simple queries of which the composite query is made.

An existing solution evaluates the keywords provided by user and ranks them with respect to the number of their appearances in the relevant categories.

SUMMARY

Provided is a method for semantic context based keyword search techniques. The method comprises: receiving, with a processor of a computer, a query with one or more keywords, one or more relevant words, and one or more selected services; calculating a general relevance indicator for each service among services in a category based on keyword relevance indicators of the one or more keywords in the query for the services in the category and based on relevant word relevance indicators of the one or more relevant words in the query for the services in the category; ranking the services in the category based on the general relevance indicator for each of the services; and, in response to determining that at least one of the selected services is not ranked high with reference to the ranked services in the category, identifying at least one of: one or more additional keywords, one or more additional relevant words, and one or more additional services to provide as recommendations.

Provided is a computer system for semantic context based keyword search techniques. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform: receiving a query with one or more keywords, one or more relevant words, and one or more selected services; calculating a general relevance indicator for each service among services in a category based on keyword relevance indicators of the one or more keywords in the query for the services in the category and based on relevant word relevance indicators of the one or more relevant words in the query for the services in the category; ranking the services in the category based on the general relevance indicator for each of the services; and, in response to determining that at least one of the selected services is not ranked high with reference to the ranked services in the category, identifying at least one of: one or more additional keywords, one or more additional relevant words, and one or more additional services to provide as recommendations.

Provided is a computer program product for semantic context based keyword search techniques. The computer program product comprising a computer readable storage medium having program code embodied therewith, the program code executable by at least one processor to perform: receiving, by the at least one processor, a query with one or more keywords, one or more relevant words, and one or more selected services; calculating, by the at least one processor, a general relevance indicator for each service among services in a category based on keyword relevance indicators of the one or more keywords in the query for the services in the category and based on relevant word relevance indicators of the one or more relevant words in the query for the services in the category; ranking, by the at least one processor, the services in the category based on the general relevance indicator for each of the services; and, in response to determining that at least one of the selected services is not ranked high with reference to the ranked services in the category, identifying, by the at least one processor at least one of: one or more additional keywords, one or more additional relevant words, and one or more additional services to provide as recommendations.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide a technique of discovering services, such as web services. In embodiments, services mentioned herein refer to any services implemented on an information system and that can be accessed from telecommunication networks. Services include, but are not limited to, web services.

A keyword is used in the domain of information retrieval. A keyword may be used to identify the key message or key concept of a document. However, as part of a natural language, the meaning of a keyword may be ambiguous. Its meaning may depend on the context in which the keyword appears. With embodiments, relevant words are employed to capture the context of these keywords. This is similar to ontology, where the context of a concept may be described as the properties of the concept or its relationship to other concepts.

Figure 1:
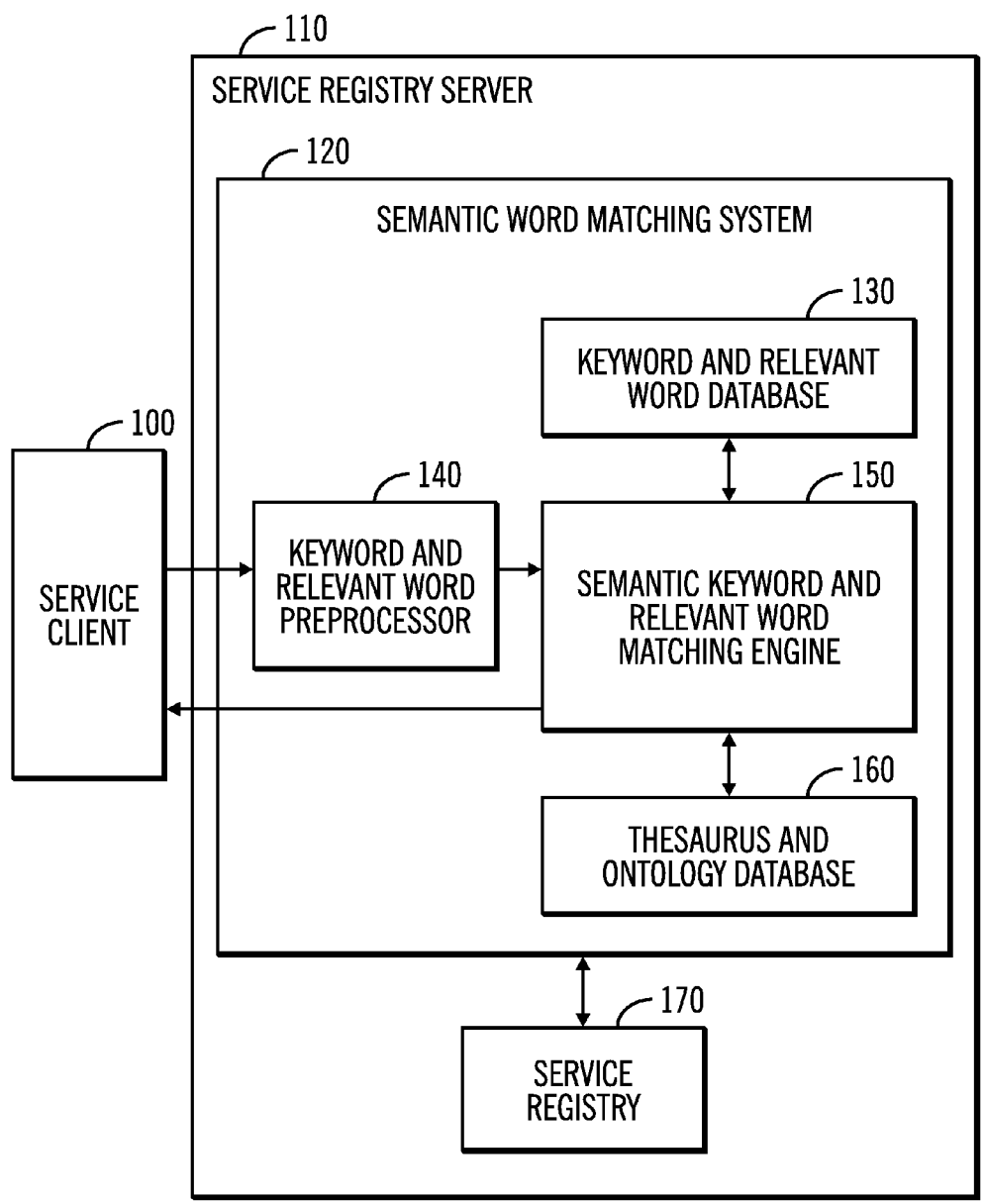
FIG. 1 illustrates a computing architecture including a semantic word matching system in accordance with certain embodiments.

FIG. 1 illustrates a computing architecture including a semantic word matching system 120 in accordance with certain embodiments. A service client 100 interacts with a service registry server 110 through a communication network. The service registry server 110 includes the semantic word matching system 120 and a service registry 170.

In certain embodiments, the service client 100 may interact with the service registry server 110 through one or more user interfaces provided by the semantic word matching system 120.

The semantic word matching system 120 provides an integrated and iterative process to generate and identify more accurate or descriptive keywords and more accurate or descriptive relevant words found in the context of a service or services published in a service registry 170, and the identified words are used to improve a query. For example, the semantic word matching system 120 identifies inaccurate keywords and inaccurate relevant words and provides more accurate keywords and more accurate relevant words. The semantic word matching system 120 not only distinguishes the keywords that identify a service and the relevant words that defines the context of a service, but also provides a technique that combines a service keyword search (i.e., keywords provided in a search for the service) and a service context relevant word search in an integrated manner.

The semantic word matching system 120 has four components: a keyword and relevant word database 130, a keyword and relevant word preprocessor 140, a semantic keyword and relevant word matching engine 150 ("matching engine" 150), and a thesaurus and ontology database 160. In certain embodiments, there may be a separate thesaurus database and a separate ontology database.

The semantic word matching system 120 utilizes the iterative keyword and context based process to discover, for example, web services available in service oriented information systems and networks. In alternative embodiments, the semantic word matching system 120 may discover items other than web services.

The service registry 170 enables service providers to publish services and enables service consumers to search and use these published services. The service registry 170 stores the information of the published services.

The matching engine 150 provides a mechanism to integrate keyword search and context matching into a mutual-correction and self-correction search process by allowing users to provide feedback. The mutual-correction (correction by a user at the service client 100 and by the semantic word matching system 120) is performed with an iterative process.

The keyword and relevant word database 130 holds the information of the keywords and relevant words of services provided by service providers or generated from service metadata. The information in the keyword and relevant word database 130 is retrieved or derived from the service information stored in the service registry 170.

In certain embodiments, the relationship information between a word and a query or service is defined as a general relevance indicator, which is a weight of a word associated with a query (and referred to herein as a general word relevance indicator) or which is a weight of a query associated with a service (and referred to herein as a general query relevance indicator).

The keyword and relevant word preprocessor 140 is employed to verify that the keywords and relevant words are valid. The thesaurus and ontology database 160 is employed in the process for identifying keyword synonyms. With reference to synonyms, the meaning of words depends on the context in which they are used. For example, the terminologies used by the service provider may be different from the terminologies used by the service client 100.

Services may be grouped into classifications. Classifications may be created by standard bodies and may have clearly defined and well-understood names for subcategories. These classifications may be plugged into a service registry if they are not a built-in feature. As a categorization mechanism, classification and its relationship with services, keywords and relevant words may be integrated within the keyword search technique.

The communication between the service client 100 and the semantic word matching system 120 is an iterative process. The service client 100 and the semantic word matching system 120 pass keyword and relevant words back and forth one or more times to identify the more accurate or descriptive keywords and relevant words used in the context of the services that a user at the service client 100 is trying to identify.

When the service client 100 communicates with the semantic word matching system 120, the keyword and relevant word preprocessor 140 receives a query first from the service client 100 and examines the keywords and relevant words to make sure the keywords are valid (e.g., no spelling errors, no stop words, correctly spelled (e.g., based on checking a dictionary)). If the keyword and relevant word preprocessor 140 identifies an error in the keywords, the keyword and relevant word preprocessor 140 informs the matching engine 150, and the matching engine 150 forwards the information to the service client 100 in a message sent back to the service client 100.

The matching engine 150 is the component implementing the matching techniques. The matching engine 150 receives the preprocessed query from the keyword and relevant word preprocessor 140, retrieves keywords and relevant words of services from the keyword and relevant word database 130, fetches synonyms and related words of keywords and relevant words from the thesaurus and ontology database 160, compares the keywords and relevant words in the query and the ones in the services, and generates an updated version of a keyword list and a relevant word list. The matching engine 150 renders the modified keyword list and relevant word list back to the service client 100 for further feedback and adjustment.

The keyword and relevant word database 130 is the data store in which the keywords and relevant words for each service are stored. The semantic word matching system 120 calculates the general relevance indicator of every keyword for each category and stores these general relevance indicator values in the keyword and relevant word database 130.

The thesaurus and ontology database 160 has a thesaurus that is utilized by the matching engine 150 to find synonyms between two sets of words. In certain embodiments, two keywords or relevant words are synonyms if they have a same or a very similar meaning. The thesaurus and ontology database 160 also has an ontology database that contains the information about concepts (i.e., objects and the categories to which they belong or classes defined in an object-oriented environment), their properties and their relationships. Keywords are mapped to the name of concepts, and the relevant words are generated from identifying the names of the concept's properties and relationships.

The semantic word matching system 120 enables service consumers to identify services published in a service registry by specifying or selecting a number of keywords and a number of relevant words. In particular, the matching engine 150 identifies the more accurate or descriptive keywords and the relevant words that the best-fit services have (e.g., for an initial or modified set of keywords and/or relevant words provided by the service user). The synonym issue and ambiguity of the meaning of words are addressed with the thesaurus and ontology database 160. The semantic word matching system 120 allows service users to retrieve a list of candidate services at the end of process.

In certain embodiments, the semantic word matching system 120 provides assistance on keyword and context-based relevant word selection for both service consumers and providers. The semantic word matching system 120 facilitates the service searching process by ranking the services and guiding service users to make correct keyword and relevant word selections.

With the semantic word matching system 120, intelligence is built-in to utilize not only the relationships between queried keywords and service key words, but also the relationship of these keywords and the relevant words. It gives the user recommendations (i.e., suggestions), and analyzes the user's feedback to do a more effective search.

The semantic word matching system 120 provides a process to collect and utilize the relationships between service keywords and the relevant words in the context of these keywords. The same concept may be applied to other context related service metadata in a service registry as well.

More specifically, by comparing the keywords supplied by a user (in a query from the service client 100) and the relevant words associated with these keywords, the matching engine 150 may quickly identify the more accurate or descriptive keywords and the related services, with additional help from the thesaurus and ontology database 160 and the feedback from the user. The user's feedback includes providing/selecting keywords and relevant words about the service iteratively.

It is not efficient or effective to require users to give detailed information about the services they seek in a service registry if there are millions or more services published in the registry. Instead, it may be more practical to allow the users to give a number of keywords and relevant words, and then make refined selections based on recommended keywords and relevant words provided by the matching engine 150. That is, with the semantic word matching system 120, it is the task of the matching engine 150 to help identify the best candidate services for the users.

The semantic word matching system 120 enable users to search services published in a registry (in a manner similar to how a web search engine may be used to search web pages), with limited or no prior knowledge about the registry structure and the exact details of the services published in the registry.

By the same token, the keyword and context information improvement techniques employed by the semantic word matching system 120 can not only help service consumers to search services, but also help service providers to document and classify their services.

Figure 2:
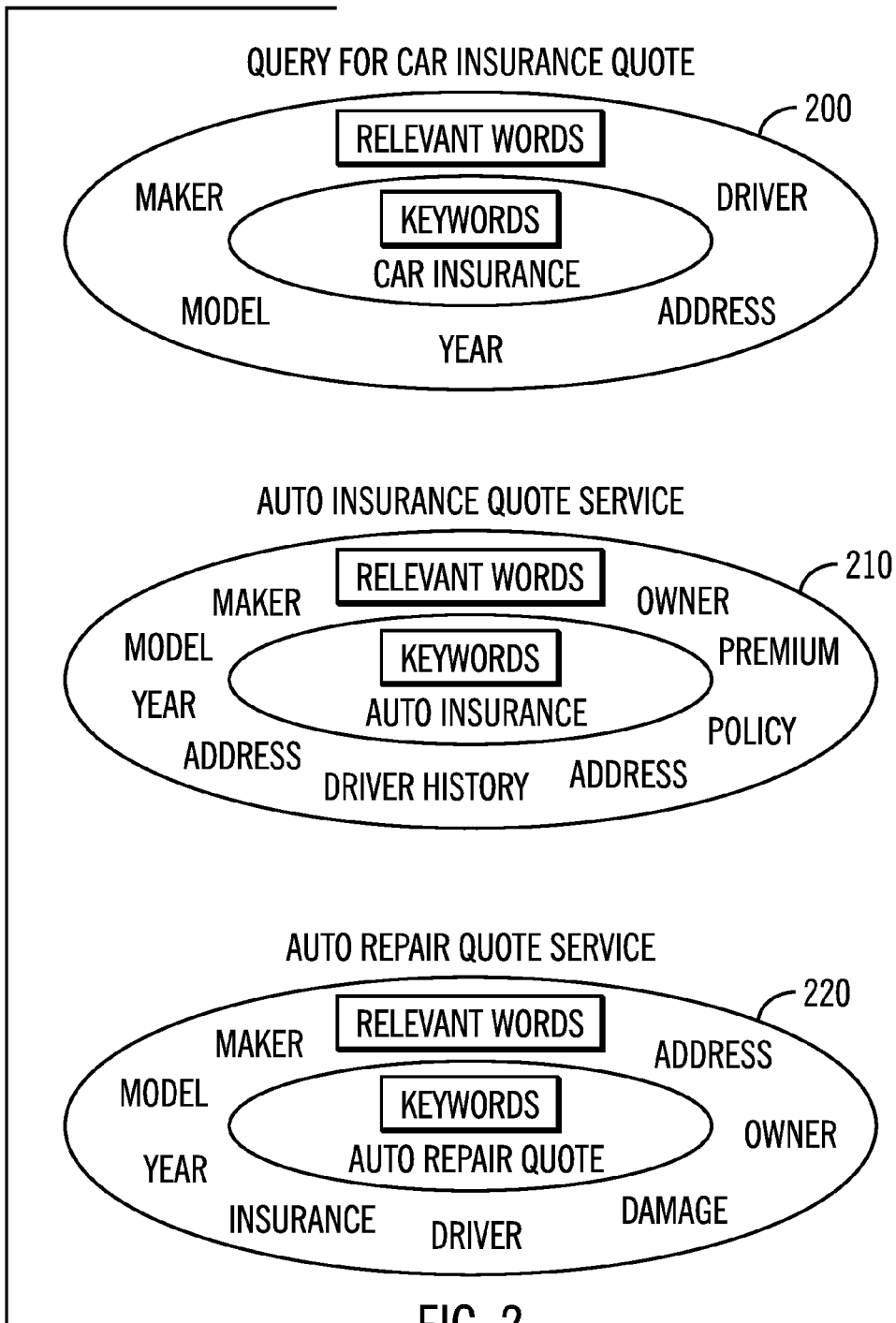
FIG. 2 illustrates the graphs of a query and two services with a plurality of keywords and a plurality of relevant words in accordance with certain embodiments.

FIG. 2 illustrates a graph of a query and two services in accordance with certain embodiments. In particular, a query is associated with a list of keywords and a list of relevant words. Each of the services is also associated with a list of keywords and a list of relevant words.

A keyword of a query or a service is one of the words to define or describe the query or service. A relevant word of a query or a service is one of the related words used to describe the details or the context of the query or the service. Although keywords may be included as part of relevant words for a query or service, in certain embodiments, keywords and relevant words of a query or a service are mutually exclusive.

FIG. 2 is used to describe the measurement, general relevance indicator, of the relationship between two entities, such as a query and a service.

In certain embodiments, when a service is published in the service registry, the service provider provides the keywords and relevant words of the service. In addition, existing solutions may be used to facilitate the creation of these keywords and relevant words.

Typically, a user searches for services in a particular domain or category. Service providers may specify the categories to which their services belong in order to facilitate the user's search. For instance, if an auto insurance quote service is published in the registry, the service provider may specify that this service belongs to category "Insurance Agencies & Brokerages" in the North American Industry Classification System. This category is a subcategory of category "Insurance Carriers and Related Activities", which in turn is a subcategory of category "Finance and Insurance". Embodiments describe a technique to use keywords and relevant words to search services within a domain or category.

A general relevance indicator may be described as a weight to measure how relevant two documents are. Each of the documents contains a set of keywords and a set of relevant words. In certain embodiments, a document may be a single keyword or multiple keywords with a number of relevant words, a service or a query.

In particular, a query with a list of keywords and a list of relevant words may be viewed as a document. A service containing a collection of keywords and relevant words may also be viewed as a document. Different schemes to measure similarity of documents based on the weight of their keywords have been developed in the information retrieval research, such as cosine similarity, Euclidean distance, Dice coefficient, and Jaccard index. Some of these schemes may be employed to measure the similarity between a query and a service. In conventional information retrieval systems, the weights of the keywords used in some of these schemes are computed using a Term Frequency-Inverse Document Frequency (TF-IDF) based technique.

The relevance indicator (RI) is a measure similar to TF-IDF, which is a weighting scheme used to evaluate how important a term is to a document in a collection of documents.

Keyword Frequency (KWF) of a keyword associated with a service is similar to Term Frequency (TF). KWF measures how often a keyword appears in a service. In certain embodiment, KWF is defined as the reciprocal of all the keywords the service has if the server has this keyword. Equation (1) specifies $KWF_i$:

$$KWF_i = \frac{k_{ij}}{M_k}$$

In Equation (1), $KWF_i$ is the keyword frequency for keyword i in service j; $M_k$ is the total number of keywords in the service j; $k_{ij}$ is 1 if service j in the category has keyword i, and $k_{ij}$ is 0 if service j in the category does not have keyword i.

The uniqueness measure of a keyword in a collection of services, like Inverse Document Frequency (IDF), is called Keyword Inverse Service Frequency (KISF). In certain embodiments, KISF is defined as the log of the quotient of total number of services and the number of services containing the keyword published in a certain category in the service registry. Equation (2) specifies $KISF_i$:

$$KISF_i = \log \frac{N}{\sum_{j=1}^{N} k_{ij}}$$

In Equation (2), $KISF_i$ is the inverse service frequency for keyword i in a specific category of a classification system; $k_{ij}$ is 1 if service j has keyword i, and $k_{ij}$ is 0 if service j does not have keyword i; and N is the total number of services registered in the category.

$KRI_i$ is the keyword relevance indicator of keyword i associated with a service. Equation (3) specifies $KRI_i$:

$$KRI_i = KWF_i \times KISF_i$$

On the same token, Relevant Word Frequency (RWF) of a relevant word i associated with a service can be defined as the following Equation (4):

$$RWF_i = \frac{r_{ij}}{M_r}$$

In Equation (4), $r_{ij}$ is 1 if service j in the category has relevant word i, and $r_{ij}$ is 0 if service j in the category does not have relevant word i. Also, $M_r$ is the total number of relevant words in the service j.

Relevant word Inverse Service Frequency (RISF), the uniqueness measure of a keyword in a collection of services, is defined as the following Equation (5):

$$RISF_i = \log \frac{N}{\sum_{j=1}^{N} r_{ij}}$$

In Equation (5), $RISF_i$ is the inverse service frequency for relevant word i in a specific category of a classification system; $r_{ij}$ is 1 if service j has relevant word i, and $r_{ij}$ is 0 if service j does not have relevant word i; and N is the total number of services registered in the category.

$RRI_i$ is the relevant word relevance indicator of relevant word i associated with a category. Equation (6) specifies $RRI_i$:

$$RRI_i = RWF_i \times RISF_i$$

$GRI_Q$ is the query general relevance indicator of a query associated with a service in a category to measure the similarity between the query and the service. $GRI_Q$ of a query containing a plurality of keywords and relevant words is an aggregation of the keyword relevance indicators and relevant words associated with this service. Since relevant words may be less important than keywords for query and service matching in certain embodiments, a relevant factor (e.g., a weight) is introduced. The relevant factor is a real number between 0 and 1. In certain embodiments, similar to the cosine similarity used with the vector space model developed in information retrieval research, $GRI_Q$ is the cosine of the angle between two multidimensional vectors representing the query and the service. Equation (7) specifies $GRI_Q$:

$$GRI_Q = \frac{\sum_{i=1}^{M_{qk}} KRI_i + \sum_{i=1}^{M_{qr}} \alpha_i^2 \times RRI_i}{\left(\left(M_{qk} + \sum_{i=1}^{M_{qr}} \alpha_i\right)\left(\sum_{i=1}^{M_{sk}} KRI_i^2 + \left(\sum_{i=1}^{M_{sr}} \alpha_i^2 \times RRI_i^2\right)\right)\right)^{\frac{1}{2}}}$$

In Equation (7), $KRI_i$ is the keyword relevance indicator of keyword i associated with the service; $M_k$ is the total number of keywords in the query; $RRI_j$ is the relevant word relevance indicator of relevant word i associated with the service; Mr is the total number of relevant words in the query; $\alpha_i$ is the relevant factor for relevant word i (and has a value between 0 and 1).

Since Equation (7) based on a vector space model may generate overly small $GRI_Q$ values for large services with a large number of keywords and relevant words, the value of $GRI_Q$ is adjusted in certain embodiments if the number of keywords and relevant words of the services under comparison are significantly different.

A simple case illustrating the above concept is shown in FIG. 2. A query looking for car insurance quote 200 has three keywords: Car, Insurance, and Quote. The query has five relevant words: Maker, Model, Year, Address, and Driver. By the same token, two services published in a service registry have 3 keywords each. The first service, auto insurance quote service 210, has nine relevant words. The second service, auto repair quote service 220, has eight relevant words.

The thesaurus and ontology database 160 may identify that Car and Auto are synonyms. So the keyword Car in the query is replaced with Auto before the calculation of GRI for these two services.

For simplicity, assume that Keyword Inverse Service Frequency for each keyword has the same value 10 and that Relevant word Inverse Service Frequency for relevant words also has the same value 10. Assume the relevant factor a for each relevant word has the same value 0.5.

The three keywords of query for car insurance quote 200 match all three of the keywords of auto insurance quote service 210, and match two of the three keywords of auto repair quote service 220. The five relevant words of the query for the car insurance quote 200 match four relevant words of a total of nine relevant words of auto insurance quote service 210 and match five relevant words of a total of eight relevant words of auto repair quote service 220. The general relevance indicators of the query associated with each service are:

Auto Insurance Quote Service:

$$GRI^*_{insurance''} = \frac{\frac{1}{3} \times 10 \times 3 + 0.5^2 \times \left(\frac{1}{9} \times 10\right) \times 4}{\left[(3 + 0.5 \times 4)\left(\left(\frac{1}{3} \times 10\right)^2 \times 3 + 0.5^2 \times \left(\frac{1}{9} \times 10\right)^2 \times 9\right)\right]^{\frac{1}{2}}} = 0.827$$

Auto Repair Quote Service:

$$GRI^*_{repair''} = \frac{\frac{1}{3} \times 10 \times 2 + 0.5^2 \times \left(\frac{1}{8} \times 10\right) \times 5}{\left[(3 + 0.5 \times 5)\left(\left(\frac{1}{3} \times 10\right)^2 \times 2 + 0.5^2 \times \left(\frac{1}{8} \times 10\right)^2 \times 8\right)\right]^{\frac{1}{2}}} = 0.735$$

Figure 3A:
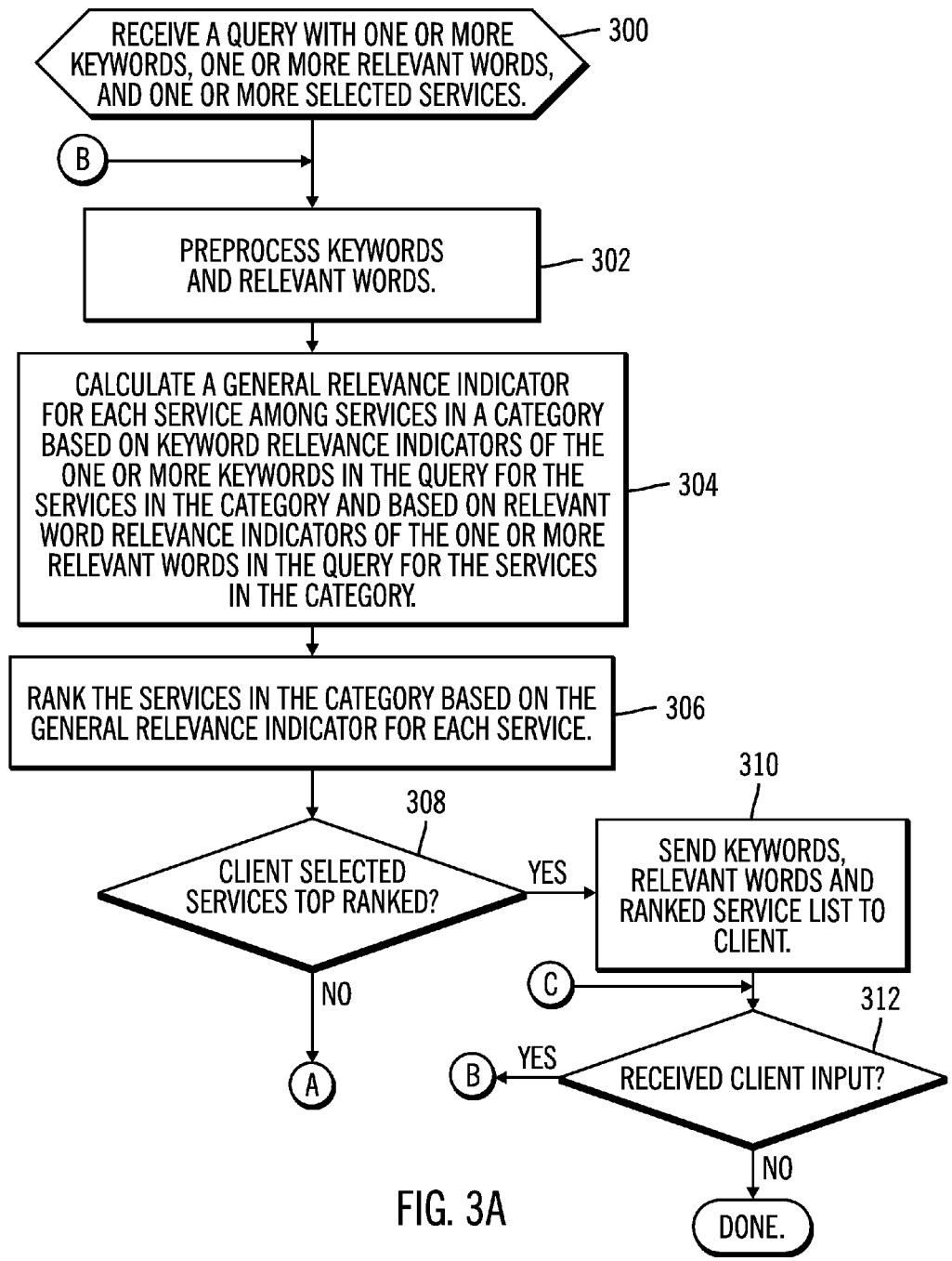
FIGS. 3A and 3B illustrate, in a flow diagram, operations performed by the keyword and relevant word matching process within a query semantic matching system in accordance with certain embodiments.
Figure 3B:
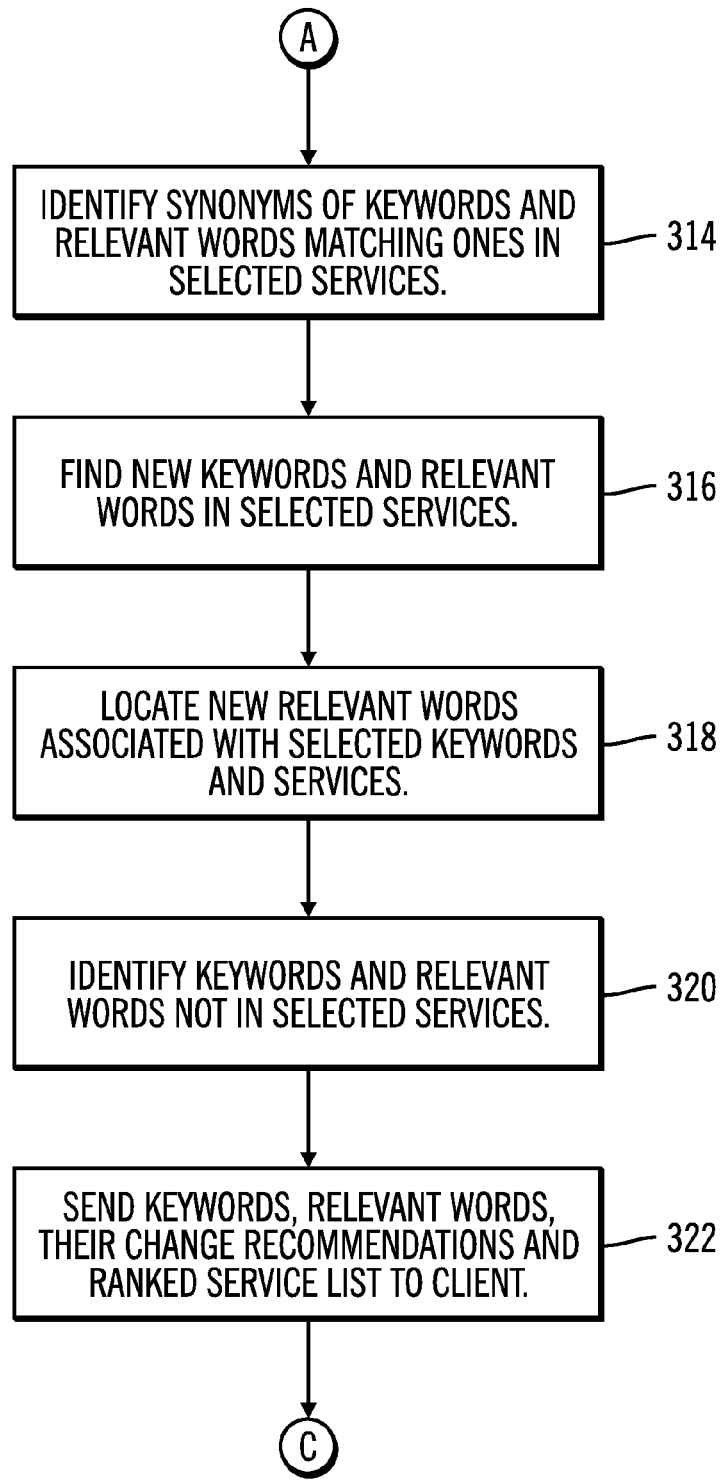

FIGS. 3A and 3B illustrate, in a flow diagram, operations performed by the keyword and relevant word matching process within the semantic word matching system 120 in accordance with certain embodiments.

The semantic word matching system 120 processes a query received from the service client 100. The matching process is an iterative process between the service client 100 and the semantic word matching system 120. The semantic word matching system 120 returns the updated keyword and relevant words to the service client 100 at the end of each iteration. The service client 100 may then provide feedback by selecting displayed keywords and relevant words, and the selected words are used in the next iteration. The query improvement process employed by the semantic word matching system 120 may iterate multiple times before the service client 100 is satisfied with the query result or quits the process.

Processing begins at block 300, with the semantic word matching system 120 receiving a query (with one or more keywords, zero or more relevant words, and zero or more selected services) from the service client 100. The keywords in the query may be referred to as query keywords, while the relevant words in a query may be referred to as query relevant words.

In certain embodiments, in the first iteration, the query generated by the service client 100 may include the keywords, and may or may not include the relevant words specified by the service client 100, and may not include any selected services. However, at the end of the first iteration and each subsequent iteration, the semantic word matching system 120 may recommend additional keywords and relevant words, and the service client 100 may select or confirm one or more of the keywords and relevant words to be included in the query as keywords and relevant words. The service client 100 may select one or more services returned by semantic word matching system 120 as the most relevant services. In certain embodiments, each query in subsequent iterations contains the keywords and the relevant words specified or confirmed by the service client 100.

In certain embodiments, if the service client 100 changes one or more keywords in the query by itself (i.e., not the recommended changes suggested by the semantic word matching system 120), the query may be treated as a new query by the semantic word matching system 120.

In block 302, the keyword and relevant word preprocessor 140 receives the query and preprocesses the keywords and relevant words. If the keyword and relevant word preprocessor 140 identifies a spelling error or a stop word, the keyword and relevant word preprocessor 140 informs the matching engine 150 to ignore the wrongly spelt word or stop word and to forward the information to the service client 100 to correct the query.

In block 304, the matching engine 150 calculates the general relevance indicator of the query GRI with respect to each of the services in a specific search domain or category. In certain embodiments, the hierarchy of search domains and categories are predefined. The granularity of the search domains may be predefined or may be adjusted based on the average value of the general relevance indicator of the query GRI within a domain and its sub-domains. In this case, the hierarchy of the search domains is traversed to locate the most relevant and specific domain for the query. The general relevance indicator of a query for a service describes how closely the service is related to a query (e.g., how similar they are in term of the keywords and relevant words they have in common). In block 306, the matching engine 150 also ranks the services based on their calculated general relevance indicators.

In block 308, the matching engine 150 determines whether each selected service in the query ranked higher than the ranked services in the specific search domain or category others (based on the ranking in block 306). If so, the processing continues to block 310, otherwise, processing continues to block 314 (FIG. 3B). In certain embodiments, if the query has no selected service and it is the first iteration of the query processing, the processing continues to block 310. In certain embodiments, if the query has no selected service and it is not the first iteration of the querying process, it indicates that the service client 100 did not select any service in the previous re-turned service result, and the processing continues to block 314.

In block 310, the matching engine 150 sends the unchanged keywords and relevant words, as well as, the newly ranked service list, to the service client 100 to enable the service client 100 to select or verify new services. From block 310, processing continues to block 312. In block 312, the matching engine 150 determines whether the user has provided input (e.g., new keywords, relevant words and/or services or selections from the returned keywords, relevant words and/or services). If so, processing continues to block 302, otherwise, processing is done.

If there are one or more selected services that are not top-ranked, processing continues block 314. This is caused by the mismatch between the keywords and relevant words specified by the service client 100 and the keywords and relevant words associated with the related services. In block 314, the matching engine 150 identifies synonyms of keywords and relevant words that may be used to substitute corresponding keywords and relevant words in the query. In particular, the matching engine 150 identifies keywords and relevant words not associated with non-top-ranked selected services to match ones associated with non-top-ranked services that may be used to replace the keywords and relevant words in the query. A non-top-ranked selected service may be described as a selected service whose query general relevance indicator value is not among the highest in block 310.

To identify the synonyms, the matching engine 150 fetches the keywords belonging to the non-top-ranked selected services in the query from the keyword and relevant word database 130. Then, the matching engine 150 locates the service keywords associated with the non-top-ranked services, but not in the query, and vice versa (i.e., locates the keywords in the query, but not in the non-top-ranked services). The matching engine 150 also fetches synonyms from the thesaurus and ontology database 160 and identifies any synonyms between these two groups of keywords (i.e., keywords and service keywords). If a pair of synonyms are identified, one from each group (i.e., one from the keywords and one from the service keywords), the recommendation is created to suggest to that the service client 100 replace (i.e., substitute) the keyword in the query with the synonym belonging to the non-top-ranked selected service. For example, assume that the non-top-ranked selected service is auto insurance quote service 210. The keyword "auto" is a keyword of auto insurance quote service 210, but not in the query for car insurance quote 200. On the other hand, the keyword "car" is in query Q, but a keyword auto insurance quote service 210. The thesaurus and ontology database 160 indicates that auto and car are synonyms. Therefore, a recommendation is created to suggest that the service client 100 substitute the keyword "car" in the query with the keyword "auto".

The same technique is used to identify the synonyms for relevant words in block 314.

In block 316, the matching engine 150 identifies new keywords and relevant words in the non-top-ranked services that may be added to the query. In particular, for the keywords and relevant words in the non-top-ranked service, if they are not in the query and no synonyms for them are found at block 314, a recommendation is created to suggest that the service client 100 add these new keywords and relevant words in the query. In certain embodiments, the recommendation is provided from block 316 when the service mismatch occurs between the choices of the service client 100 and the ranking of the matching engine 150. As an example, the keyword "premium" may be identified as such a relevant word and a recommendation is created for the service client 100 to add the relevant word "premium" into the query.

In block 318, the matching engine 150 identifies new relevant words that may be added to the query. In particular, for each keyword, matching engine 150 retrieves the names of properties and the name of relationships of the concept identified by the keyword in thesaurus and ontology database 160 as candidate relevant words. If these candidate relevant words are not in the query and no synonyms for them are found from thesaurus and ontology database 160, a recommendation is created to suggest that the service client 100 add these new relevant words in the query. In certain embodiments, the recommendation is provided from block 318 when the service mismatch occurs between the choices of the service client 100 and the ranking of the matching engine 150. As an example, matching engine 150 uses the keyword "insurance" to identify "policy" as a relevant word candidate based on the ontology information of concept insurance stored in thesaurus and ontology database 160. A recommendation is created for the service client 100 to add the relevant word "policy" into the query for car insurance quote 200.

In block 320, the matching engine identifies the keywords and relevant words that are candidates to be removed from the query. In particular, the matching engine 150 examines the keywords and relevant words in the query and locates ones not associated with the non-top-ranked services and associated with top-ranked, but not selected by the service client 100, services. If no synonyms in the non-top-ranked services are found for these keywords and relevant words at block 320, a recommendation is created to suggest that the service client 100 remove these keywords and relevant words in the query.

From block 320, processing continues to block 322. In block 322, the matching engine 150 provides the keyword and relevant word change recommendations and the ranked service list to the service client 100 (e.g., via the user interface). The service client 100 may then provide feedback (block 312) by selecting keywords and relevant words to be used in the next iteration of query. Service client 100 also selects the best-fit services in the ranked service list as feedback.

Embodiments provide effective search and retrieval of relevant entries in a service repository given a user query consisting of one or more keywords and relevant words. Embodiments take into consideration the synonyms of words and association of words represented by ontology relationships among concept words.

With embodiments, users do not need to have detailed knowledge about what and how service metadata are stored in the service registry and/or the exact keywords or relevant words used by the services in the first place to specify keywords and relevant words to carry out effective searches.

Embodiments of the invention relate to semantic based keyword and ontology search for distributed computing systems and network environments, and, more specifically, for any network-based services.

Embodiments are provided for generating recommendations for service query enhancements and query result ranking improvements. A service query with keywords and relevant words is received in an iterative process. In response to calculating the ranks of queried services, a query general relevance indicator of the query is evaluated using individual queried services using keyword and relevant word general relevance indicators, and the ranked query results are provided for use in selecting new keywords and relevant words to be submitted with the query in the next iteration.

Certain embodiments provide a technique for utilizing an iterative context based search according to the mutual refinements of both keyword and ontology based semantic context for a service by: responsive to receiving a search query from a user with keywords for a service, identifying a semantic context using relevant words for the search query; searching for services according to the keywords and context; assigning for each service Si a ranking called general relevancy indicator Ri; iteratively identifying new keywords according to the context and refining the context according to the new keywords, as well as adjusting Ri based on an applied analytical analysis; and presenting a service Si with a higher ranking Ri before a service Sj with a lower ranking Rj.

With embodiments, the service is a network based service published with other services in the form of Software as a Service (SaaS), Data As a Service (Daas), Representational State Transfer (Restful) Web Services, Simple Object Access Protocol (SOAP) based Web Services, and etc.

With embodiments, the semantic context is based on ontology utilizing a number of relevant words selected from a group consisting of a thesaurus and an ontology database.

With embodiments, a user interface (UI) is provided to allow a user at the service client 100 select and adjust keywords, relevant words, and services to refine the search query.

Embodiments iteratively improve the keywords and relevant words of a service query. The keywords present the meaning and purpose of the query. The relevant words present the semantic context of the query. The combination of the keywords and relevant words helps describe queries and the corresponding services in an unambiguous way. Embodiments utilize both the feedback from the user who submits the query and the thesaurus and ontology database 160 to refine the query in a mutual correction process. Instead of existing approaches where the service consumer has to figure out the exact matching keywords to find the desired services, embodiments allows the user to locate the desired services published in a service registry quickly by identifying better keywords and relevant words intelligently. The relationships among keywords, relevant words, queries, and services are measured by relevance indicator and the general relevance indicator, which are weights indicating the similarity between these artifacts. The keyword search is integrated with the semantic context search into a mutual-correction and self-adjusting search process.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
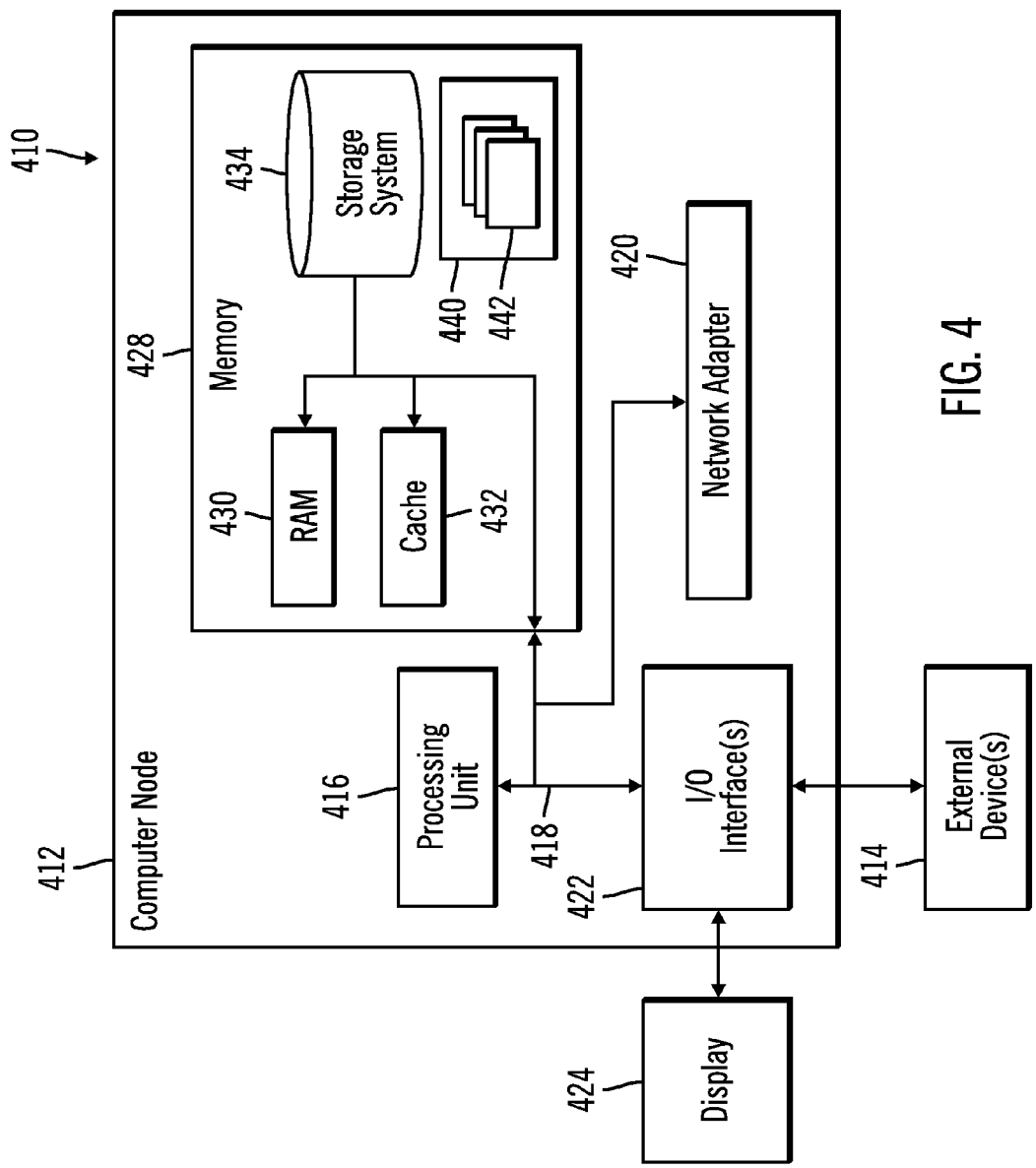
FIG. 4 illustrates a cloud computing node in accordance with certain embodiments.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
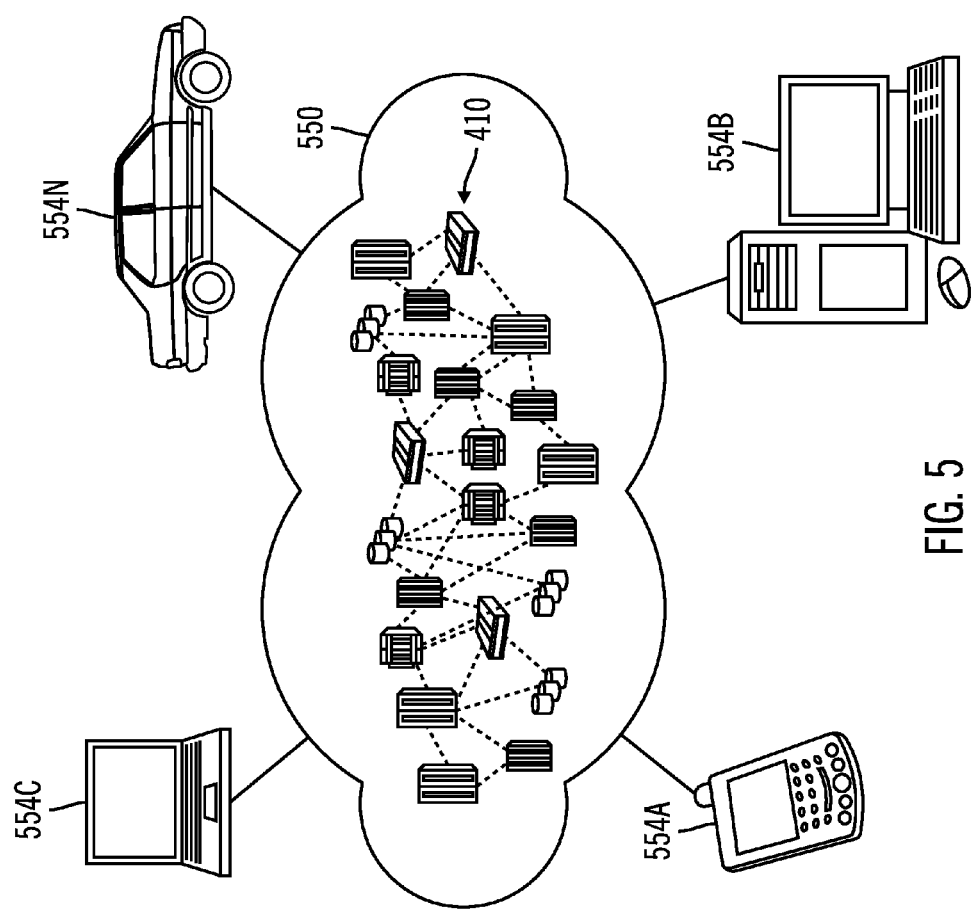
FIG. 5 illustrates a cloud computing environment in accordance with certain embodiments.

Referring now to FIG. 5, illustrative cloud computing environment 550 is depicted. As shown, cloud computing environment 550 comprises one or more cloud computing nodes 410 with which local computing devices used by cloud consumers, such as, for example, personal digital assistant (PDA) or cellular telephone 554A, desktop computer 554B, laptop computer 554C, and/or automobile computer system 554N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 410 and cloud computing environment 550 can communicate with any type of computerized device over any type of network and/or network addressable connection (e.g., using a web browser).

Figure 6:
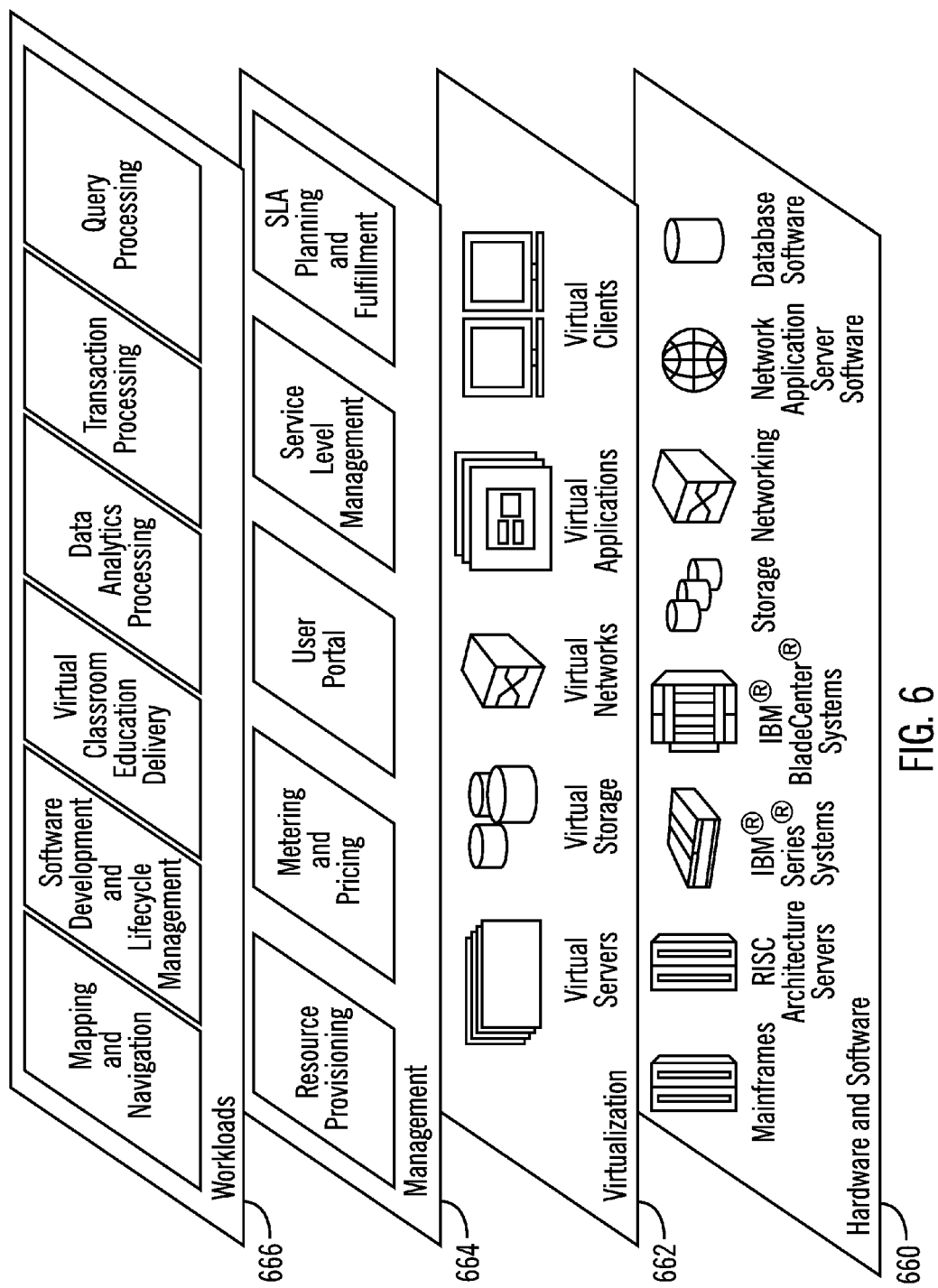
FIG. 6 illustrates abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and query processing.

Thus, in certain embodiments, software or a program, implementing query processing in accordance with embodiments described herein, is provided as a service in a cloud environment.

In certain embodiments, the service client 100 and/or service registry server 110 has the architecture of cloud computer node 410 In certain embodiments, the service client 100 and/or service registry server 110 is part of a cloud environment. In certain alternative embodiments, the service client 100 and/or service registry server 110 is not part of a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, comprising:
   receiving, with a processor of a computer, a query with keywords that each identify a key concept, relevant words that capture a context of the keywords, and one or more selected services;
   calculating a general relevance indicator for each service among services in a category using:

$$GRI_Q = \frac{\sum_{i=1}^{M_{qk}} KRI_i + \sum_{i=1}^{M_{qr}} \alpha_i^2 \times RRI_i}{\left(\left(M_{qk} + \sum_{i=1}^{M_{qr}} \alpha_i\right)\left(\sum_{i=1}^{M_{sk}} KRI_i^2 + \left(\sum_{i=1}^{M_{sr}} \alpha_i^2 \times RRI_i^2\right)\right)\right)^{\frac{1}{2}}}$$

wherein $KRI_i$ is a keyword relevance indicator of a keyword i, from the keywords, associated with a service of the services in the category,
   wherein $M_k$ is a total number of the keywords in the query,
   wherein $RRI_j$ is a relevant word relevance indicator of a relevant word i, from the relevant words, associated with the service,
   wherein Mr is a total number of the relevant words in the query, and
   wherein $\alpha_i$ is a weight for the relevant word i;
   ranking the services in the category based on the general relevance indicator for each service; and
   in response to determining that at least one of the selected services is not ranked high with reference to the ranked services in the category,
      recommending synonyms to be used to substitute corresponding keywords and synonyms to be used to substitute relevant words in the query;
      recommending new relevant words by:
         retrieving names of properties and names of relationships of a concept identified by a keyword among the keywords in an ontology database as candidate relevant words; and
         in response to determining that the candidate relevant words are not in the query and no synonyms are found, providing a recommendation that the candidate relevant words be included in the query as the new relevant words; and recommending one or more additional services to be included in the query.

2. The method of claim 1, further comprising:
identifying one of an inaccurate keyword and an inaccurate relevant word.

3. The method of claim 1, further comprising:
identifying new keywords and relevant words associated with non-top-ranked services; and
recommending the new keywords and relevant words to be added to the query.

4. The method of claim 1, further comprising:
identifying keywords and relevant words that are candidates to be removed from the query; and
recommending that the keywords and relevant words be removed from the query.

5. The method of claim 1, wherein a Software as a Service (SaaS) is configured to perform method operations.

6. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform:
receiving a query with keywords that each identify a key concept, relevant words that capture a context of the keywords, and one or more selected services;
calculating a general relevance indicator for each service among services in a category using:

$$GRI_Q = \frac{\sum_{i=1}^{M_{qk}} KRI_i + \sum_{i=1}^{M_{qr}} \alpha_i^2 \times RRI_i}{\left(\left(M_{qk} + \sum_{i=1}^{M_{qr}} \alpha_i\right)\left(\sum_{i=1}^{M_{sk}} KRI_i^2 + \left(\sum_{i=1}^{M_{sr}} \alpha_i^2 \times RRI_i^2\right)\right)\right)^{\frac{1}{2}}},$$

wherein $KRI_i$ is a keyword relevance indicator of a keyword i, from the keywords, associated with a service of the services in the category,
wherein $M_k$ is a total number of the keywords in the query,
wherein $RRI_j$ is a relevant word relevance indicator of a relevant word i, from the relevant words, associated with the service,
wherein Mr is a total number of the relevant words in the query, and
wherein $\alpha_i$ is a weight for the relevant word i;
ranking the services in the category based on the general relevance indicator for each service; and
in response to determining that at least one of the selected services is not ranked high with reference to the ranked services in the category,
recommending synonyms to be used to substitute corresponding keywords and synonyms to be used to substitute relevant words in the query;
recommending new relevant words by:
retrieving names of properties and names of relationships of a concept identified by a keyword among the keywords in an ontology database as candidate relevant words; and
in response to determining that the candidate relevant words are not in the query and no synonyms are found, providing a recommendation that the candidate relevant words be included in the query as the new relevant words; and
recommending one or more additional services to be included in the query.

7. The computer system of claim 6, wherein the program instructions, stored on at least one of the one or more computer-readable, tangible storage devices for execution by at least one of the one or more processors via at least one of the one or more memories, perform:
identifying one of an inaccurate keyword and an inaccurate relevant word.

8. The computer system of claim 6, wherein the program instructions, stored on at least one of the one or more computer-readable, tangible storage devices for execution by at least one of the one or more processors via at least one of the one or more memories, perform:
identifying new keywords and relevant words associated with non-top-ranked services; and
recommending the new keywords and relevant words to be added to the query.

9. The computer system of claim 6, wherein the program instructions, stored on at least one of the one or more computer-readable, tangible storage devices for execution by at least one of the one or more processors via at least one of the one or more memories, perform:
identifying keywords and relevant words that are candidates to be removed from the query; and
recommending that the keywords and relevant words be removed from the query.

10. The computer system of claim 6, wherein a Software as a Service (SaaS) is configured to perform computer system operations.

11. A computer program product, the computer program product comprising a non-transitory computer readable storage medium having program code embodied therewith, the program code executable by at least one processor to perform:
receiving, by the at least one processor, a query with keywords that each identify a key concept, relevant words that capture a context of the keywords, and one or more selected services;
calculating, by the at least one processor, a general relevance indicator for each service among services in a category using:

$$GRI_Q = \frac{\sum_{i=1}^{M_{qk}} KRI_i + \sum_{i=1}^{M_{qr}} \alpha_i^2 \times RRI_i}{\left(\left(M_{qk} + \sum_{i=1}^{M_{qr}} \alpha_i\right)\left(\sum_{i=1}^{M_{sk}} KRI_i^2 + \left(\sum_{i=1}^{M_{sr}} \alpha_i^2 \times RRI_i^2\right)\right)\right)^{\frac{1}{2}}},$$

wherein $KRI_i$ is a Keyword relevance indicator of a keyword i, from the keywords, associated with a service of the services in the category,
wherein $M_k$ is a total number of the keywords in the query,
wherein $RRI_j$ is a relevant word relevance indicator of a relevant word i, from the relevant words, associated with the service,
wherein Mr is a total number of the relevant words in the query, and
wherein $\alpha_i$ is a weight for the relevant word i;
ranking, by the at least one processor, the services in the category based on the general relevance indicator for each service; and in response to determining that at least one of the selected services is not ranked high with reference to the ranked services in the category,
recommending, by the at least one processor, synonyms to be used to substitute corresponding keywords and synonyms to be used to substitute relevant words in the query;
recommending, by the at least one processor, new relevant words by:
retrieving names of properties and names of relationships of a concept identified by a keyword among the keywords in an ontology database as candidate relevant words; and
in response to determining that the candidate relevant words are not in the query and no synonyms are found, providing a recommendation that the candidate relevant words be included in the query as the new relevant words; and
recommending, by the at least one processor, one or more additional services to be included in the query.

12. The computer program product of claim 11, wherein the program code is executable by at least one processor to perform:
identifying, by the at least one processor, one of an inaccurate keyword and an inaccurate relevant word.

13. The computer program product of claim 11, wherein the program code is executable by at least one processor to perform:
identifying , by the at least one processor, new keywords and relevant words associated with non-top-ranked services; and
recommending, by the at least one processor, the new keywords and relevant words to be added to the query.

14. The computer program product of claim 11, wherein a Software as a Service (SaaS) is configured to perform computer program product operations.

15. The computer program product of claim 11, wherein the program code is executable by at least one processor to perform:
identifying, by the at least one processor, keywords and relevant words that are candidates to be removed from the query; and
recommending, by the at least one processor, that the keywords and relevant words be removed from the query.

* * * * *